No. 863,124. PATENTED AUG. 13, 1907.
D. J. WELTON.
FENDER FOR MOTOR VEHICLES.
APPLICATION FILED JUNE 6, 1906.
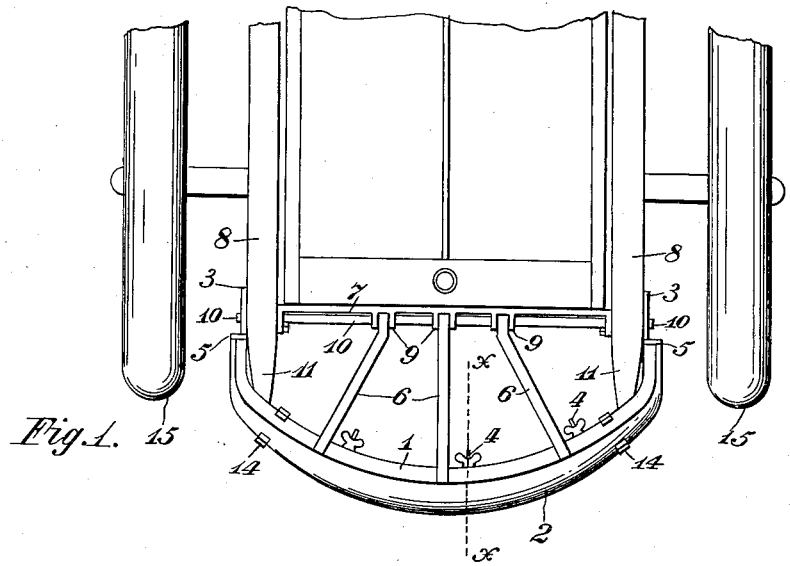
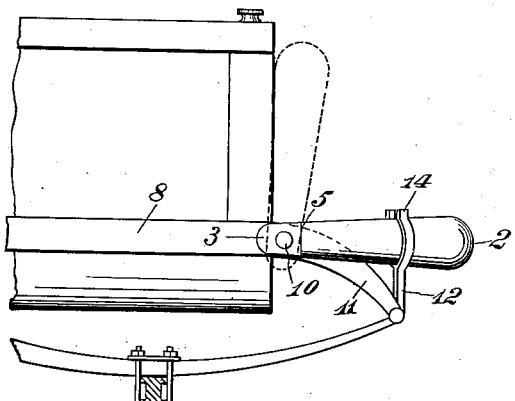
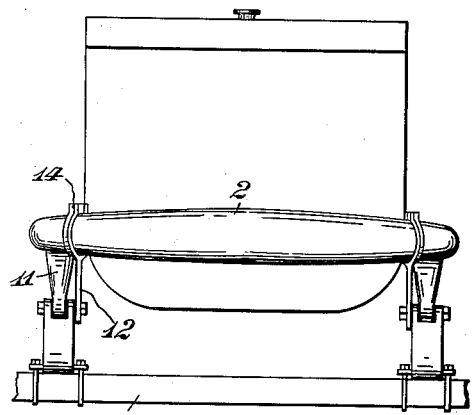
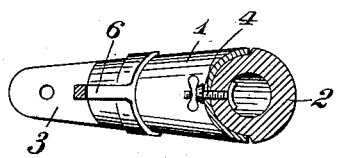
Witnesses
Benj. Finckel
Alice B. Cook
Inventor
Dante J. Welton
by Finckel & Finckel
his Attorneys

UNITED STATES PATENT OFFICE.

DANTE J. WELTON, OF COLUMBUS, OHIO.

FENDER FOR MOTOR-VEHICLES.

No. 863,124.      Specification of Letters Patent.      Patented Aug. 13, 1907.

Application filed June 6, 1906. Serial No. 320,372.

*To all whom it may concern:*

Be it known that I, DANTE J. WELTON, a citizen of the United States, residing at Columbus, in the county of Franklin and State of Ohio, have invented certain new and useful Improvements in Fenders for Motor-Vehicles, of which the following is a specification.

My invention relates to new and useful improvements in fenders for motor vehicles.

The object of the invention is to provide a fender readily attachable to the forward end of the motor vehicle frame and arranged to protect the vehicle as well as pedestrians.

Another feature resides in the provision of a fender comprising a resilient or cushioning part which extends entirely across the front end of the frame, being quite large at its central portion and tapering toward its ends.

A still further object lies in the arrangement whereby the fender may be swung upward to permit free access to the forward end of the vehicle for the purpose of "cranking" and the like.

Finally the object of the invention is to provide a device of the character described that will be strong, durable and efficient and simple and comparatively inexpensive to construct and one in which the several parts will not be liable to get out of working order.

With the above and other objects in view, the invention consists of the novel details of construction and operation, a preferable embodiment of which is described in the specification and illustrated in the accompanying drawings, wherein:

Figure 1 is a partial plan view of the forward portion of a motor vehicle, showing my fender applied thereto, Fig. 2 is a partial side elevation of the motor vehicle, certain parts being removed to more clearly illustrate the fender which is also shown in side elevation, and in lowered and raised position, the latter being shown in dotted lines. Fig. 3 is an elevation of the front end of an automobile with the fender attached. Fig. 4 is a vertical sectional view of the fender, taken on the line $x$—$x$ of Fig. 1.

In the drawings, the numeral 1 designates a curved supporting member which is dished or concaved to receive a cushioning or resilient member 2. The member 1 is bent near its ends and terminates in flat ears 3, by which it is attached to the sides of frame 8 of motor vehicle. The member 2 which is preferably formed of rubber or other yieldable material, fits snugly in the member 1. This member 2 is substantially round in cross-section, although it may be of any suitable shape, and tapers toward its ends, the supporting member 1 being correspondingly shaped. Any suitable means as screw lugs 4, may be employed for holding the member 2 in the supporting member 1, while the ends of the said resilient member are held in bands or caps 5 secured to the member 1.

The member 1 is braced by bars 6 secured at their forward ends to the member and having connection at their inner ends with a brace bar 7 extending across the motor vehicle frame 8 and firmly fixed thereto. When it is desired to pivotally mount the fender, ears 9 are provided on the brace bar 7 to receive the inner ends of the bars 6 and a rod 10 passed therethrough. This rod also extends through the frame 8 and the ears 3 of the member 1, forming a common pivot-rod on which the said member and the bars may be swung.

By bending the supporting member 1 as hereinbefore mentioned, it will swing over the spring ends 11 of the frame 8, assuming such a shape as to protect the forward end of the vehicle and yet permit a free action of the front wheels 15.

It will be seen that the fender is secured directly to the frame of the motor vehicle so as to lie in a horizontal plane and to extend but slightly in advance of the wheels. One particular in which the construction is distinguished essentially from fenders as applied to street cars, for example, is that it stands so high from the ground, lying in a plane above the front axle, 16, as indicated in Fig. 2. A lower disposition would cause it to interfere with cranking; and besides, one of the main objects being to protect the vehicle, it is important that the fender lie in the same plane with the vehicle frame, rather than being carried by a support dropped therebelow or being inclined downward therefrom, as by the present construction the shock of concussion is transmitted directly rearward to the rigid frame and the parts sustain least injury. It will be understood that this expression, "directly rearward" refers to the direction of transmission only, since it is evident that the resilient nature of the fender will absorb the shock in large measure.

It is obvious that the exact shape and arrangement of the fender must necessarily be varied to suit the different styles, sizes and shapes of motor vehicles on which it is employed and that it may be either fixed or pivoted, the essential feature being the resilient member 2 extending entirely across the forward end of the frame of the motor vehicle and tapered toward its ends. The resilient member should taper toward its ends to obviate interference with the wheels of the vehicle and permit the same to turn as usual.

Where the fender is pivoted, it is necessary to support the same in a horizontal position. Any suitable means may be provided for this purpose, as for instance, standards 12, as shown in the drawings. These standards may be attached to forward ends of the spring ends 11, as shown in Figs. 1 and 2. The parts 11 may be made rigid and formed, as in the instance shown, by extending the parts 8 forwardly and downwardly. At their upper ends, the standards are formed with spring clamps 14 which snugly embrace the members 1 and 2 holding them against displacement. The clamps being resilient and open at their upper ends, permit the fender to be readily swung upward. To guard against the fender accidentally swinging upward, any suitable means may be provided for holding the same in the clamps.

What I claim, is:

1. The combination with the frame of a motor vehicle, of a resilient fender pivoted at its rear to the forward portion of the frame, and rigid vertical brackets supporting the forward portion of said fender at their upper ends.

2. The combination with the frame of a motor vehicle, of a resilient fender pivoted at its rear to the forward portion of the frame for upward swinging, and brackets supported beneath the fender and having spring clips embracing the forward portion of said fender.

3. The combination with the frame of a motor vehicle, the underlying front axle, and the forwardly extending springs supporting said frame on said axle, of a resilient fender pivoted at its rear to the forward portion of the frame for upward swinging, and brackets extending upward from said frames and sustaining the fender against downward swinging.

4. The combination with the frame of a motor vehicle and the underlying front axle, of a pivot rod extending across and immediately adjacent the front of said frame, and a fender comprising a forwardly curved trough-shaped supporting member pivoted at its rearwardly turned ends upon said rod, a plurality of rigid braces disposed intermediate the ends of said supporting member and pivoted at their rear ends to said rod and secured at their front ends to said supporting member, and a resilient facing secured within said trough shaped member.

5. In a motor vehicle, the combination with the frame thereof having a forwardly projecting portion, a resilient fender pivotally supported at its rear and extending above said forward projection of the frame, and brackets supported on said forward projection of the frame and engaging the fender forward of its pivotal connection with the frame.

In testimony whereof I affix my signature in presence of two witnesses.

DANTE J. WELTON.

Witnesses:
JAMES O. JOHNSON,
M. B. SCHLEY.